US008721312B2

(12) United States Patent
Sawa

(10) Patent No.: US 8,721,312 B2
(45) Date of Patent: May 13, 2014

(54) KNEADING EXTRUDER

(76) Inventor: Kohei Sawa, Osaka (JP)

(*) Notice: Subject to any disclaimer, the term of this patent is extended or adjusted under 35 U.S.C. 154(b) by 0 days.

(21) Appl. No.: 13/700,257

(22) PCT Filed: May 24, 2011

(86) PCT No.: PCT/JP2011/061864
§ 371 (c)(1),
(2), (4) Date: Nov. 27, 2012

(87) PCT Pub. No.: WO2011/148937
PCT Pub. Date: Dec. 1, 2011

(65) Prior Publication Data
US 2013/0078329 A1    Mar. 28, 2013

(30) Foreign Application Priority Data
May 28, 2010  (JP) ................................ 2010-122848

(51) Int. Cl.
*B29C 47/92* (2006.01)
(52) U.S. Cl.
USPC ........ 425/146; 425/204; 425/207; 425/382.3; 425/462
(58) Field of Classification Search
USPC .............. 425/145, 146, 204, 207, 382.3, 461, 425/462
See application file for complete search history.

(56) References Cited

U.S. PATENT DOCUMENTS

| 3,930,782 | A | | 1/1976 | Bigland |
| 4,213,747 | A | * | 7/1980 | Friedrich ....................... 425/144 |
| 4,244,897 | A | * | 1/1981 | Moon .......................... 264/411 |
| 4,448,736 | A | * | 5/1984 | Emery et al. ................. 264/40.1 |
| 4,721,589 | A | | 1/1988 | Harris |
| 5,179,521 | A | | 1/1993 | Edge |
| 6,306,323 | B1 | | 10/2001 | Chu et al. |
| 2008/0122132 | A1 | * | 5/2008 | Kinoshita et al. ............... 264/12 |

FOREIGN PATENT DOCUMENTS

| DE | 1 579 002 | 9/1970 |
| DE | 38 33 776 | 4/1989 |
| JP | 50-40668 | 4/1975 |
| JP | 60-96429 | 5/1985 |

(Continued)

OTHER PUBLICATIONS

International Search Report issued Jun. 28, 2011 in International (PCT) Application No. PCT/JP2011/061864.

(Continued)

*Primary Examiner* — Yogendra Gupta
*Assistant Examiner* — Joseph Leyson
(74) *Attorney, Agent, or Firm* — Wenderoth, Lind & Ponack, L.L.P.

(57) ABSTRACT

A kneading extruder includes a barrel having an extrusion port through which kneaded material including first and second liquid raw material is extruded, and a screw shaft placed in the barrel, the screw shaft kneading the first and second raw material to produce the kneaded material in melted state. A screw driving device continuously rotates the screw shaft at a constant speed, and a die communicates with the extrusion port of the barrel, the die having an extrusion port through which the kneaded material in a pressurized state is extruded. An ejection device ejects a portion of the kneaded material between the extrusion port of the barrel and the extrusion port of the die, the ejection device including an ejection quantity regulating unit for regulating the ejection quantity of the kneaded material so that the pressure of the kneaded material at the extrusion port of the barrel is kept constant.

8 Claims, 5 Drawing Sheets

(56) References Cited

FOREIGN PATENT DOCUMENTS

| | | |
|---|---|---|
| JP | 60-214919 | 10/1985 |
| JP | 62-33621 | 2/1987 |
| JP | 2-103118 | 4/1990 |
| JP | 5-185488 | 7/1993 |
| JP | 6-55415 | 7/1994 |
| JP | 2000-167897 | 6/2000 |
| JP | 2000-345423 | 12/2000 |
| JP | 2001-510103 | 7/2001 |
| JP | 2002-28963 | 1/2002 |
| JP | 2003-127209 | 5/2003 |

OTHER PUBLICATIONS

International Preliminary Report on Patentability and Written Opinion, in the English language, mailed Dec. 13, 2012 in International Application No. PCT/JP2011/061864.

Supplementary European Search Report (ESR) issued Oct. 28, 2013 in European Patent Application EP 11 78 6636.

* cited by examiner

KNEADING EXTRUDER

TECHNICAL FIELD

The present invention relates to a kneading extruder that kneads a plurality of types of raw materials to produce kneaded material in melted state and that extrudes the produced kneaded material, by rotation of screw shafts.

BACKGROUND ART

A kneading extruder 501 as shown in FIG. 5 has conventionally been known, for instance, as a kneading extruder that kneads a plurality of types of raw materials to produce kneaded material and that extrudes the kneaded material (see Patent Document 1, for instance).

As shown in FIG. 5, the conventional kneading extruder 501 includes a screw shaft 511 or screw shafts 511 having a single-shaft structure or double-shaft structure, a barrel 512 in which the screw shaft(s) is rotatably placed in an inside space thereof, a raw material feeder 513 for supplying the raw materials into a space between the barrel 512 and the screw shaft(s) 511, a die 516 that is in communication with a barrel extrusion port 514 which is an outlet of the barrel 512 for the kneaded material, the die 516 having a die extrusion port 515 through which the kneaded material supplied from the barrel 512 is extruded to outside of the device, and a booster pump 517 that is provided between the barrel 512 and the die 516 and that supplies the kneaded material, supplied from the barrel extrusion port 514, to the die 516 while boosting pressure of the kneaded material, for instance.

A hopper 518 is connected to a raw material supply port 522 provided on the barrel 512, and the raw materials supplied from the raw material feeder 513 are supplied through the hopper 518 into the barrel 512. The raw material feeder 513 has a drive motor 513a of which number of rotations can be controlled, and a desired quantity of the raw materials are supplied from the raw material feeder 513 through the hopper 518 into the barrel 512 by control over the number of rotations of the drive motor 513a.

The screw shaft(s) 511 (single shaft or two shafts) placed in the barrel 512 is connected to a screw driving device 519. The screw driving device 519 has a drive motor 519a of which number of rotations can be controlled, and the screw shaft(s) 511 is driven to rotate with a desired number of rotations through control over the number of rotations of the drive motor 519a.

A gear pump is used as the booster pump 517, for instance, and is driven at a constant speed so that a constant quantity of the kneaded material can be supplied to the die 516 while pressure thereof is boosted. A mesh-like filter 520 is provided between the booster pump 517 and the die 516 thereby preventing foreign matter or the like into the die 516.

In the conventional kneading extruder 501 having such a configuration, the pressure of the kneaded material at the barrel extrusion port 514 is detected by a pressure detection unit 521, and the number of rotations of the drive motor 513a of the raw material feeder 513 and the number of rotations of the drive motor 519a of the screw driving device 519 are controlled on basis of the detected pressure of the kneaded material so that the pressure of the kneaded material at the barrel extrusion port 514 is controlled so as to be kept constant. Such control is generally referred to as feedback control method.

On condition that the pressure higher than a preset pressure is detected at the barrel extrusion port 514 by the pressure detection unit 521, specifically, the number of rotations of the drive motor 513a of the raw material feeder 513 is decreased so that the quantity of the raw materials that are supplied from the raw material feeder 513 into the barrel 512 is decreased. Concomitantly, the number of rotations of the drive motor 519a of the screw driving device 519 is decreased so that quantity of the kneaded material that is extruded from the barrel extrusion port 514 of the barrel 512 is decreased. Thus the pressure of the kneaded material at the barrel extrusion port 514 can be decreased.

On condition that the pressure lower than the preset pressure is detected at the barrel extrusion port 514 by the pressure detection unit 521, the quantity of the kneaded material that is extruded from the barrel extrusion port 514 is increased by increase in the quantity of the raw materials that are supplied from the raw material feeder 513 into the barrel 512 and increase in the quantity of rotations of the screw driving device 519. Thus the pressure of the kneaded material at the barrel extrusion port 514 can be increased.

In the conventional kneading extruder 501, in this manner, the quantity of the kneaded material that is supplied from the barrel extrusion port 514 through the booster pump 517 to the die 516 can be kept constant by the feedback control for keeping the pressure of the kneaded material at the barrel extrusion port 514 constant.

The conventional kneading extruder 501 including the screw shaft 511 having a single shaft structure, for instance, is used for applications for secondary processing in which the kneaded material made from compounded pellets as raw materials is extruded so as to mold tubes, films or the like. In recent years, the device including the screw shafts 511 having double shaft structure can be used for applications in which tubes, films or the like are directly molded.

In the conventional kneading extruder 501 shown in FIG. 5, however, the control method is employed in which variable control over the extrusion quantity (conveyance quantity) of the kneaded material in the barrel 512 is performed by variable control over the supplying quantity of the raw materials from the raw material feeder 513 and variable control over the number of rotations of the screw shafts 511 so that the pressure of the kneaded material at the barrel extrusion port 514 is kept constant.

Change in the number of rotations of the screw shafts 511 causes change in shear rate for the kneaded material, which exerts an influence on kneading property of the kneaded material. In addition, change in residence time of the kneaded material in the barrel 512 causes change in thermal history of the kneaded material, which also exerts an influence on the kneading property of the kneaded material. On condition that two or more types of the raw materials are mixed, change in the supplying quantities of the raw materials exerts an influence on mixture ratio of the kneaded material, in particular, the greater the number of shafts forming the screw shafts is, the more conspicuous the influence becomes.

There is a time lag (time difference on the order of several tens of seconds, for instance) until the raw materials supplied into the barrel 512 are extruded as the kneaded material from the barrel extrusion port 514. It is therefore difficult to perform follow-up on the pressure of the kneaded material at the barrel extrusion port 514 that is changing every moment, in the method in which the supplying quantity of the raw materials from the raw material feeder 513 is controlled on basis of the pressure of the kneaded material at the barrel extrusion port 514. It is more difficult to perform the follow-up on change in the pressure on condition that a plurality of types of raw materials are supplied at different supply locations into the barrel 512. Variability in the number of rotations of the screw shafts 511 in addition to variation in the supplying quantity of the raw materials causes change in the rate of screw shear that is important among conditions of kneading and thus makes it impossible to avoid change in physical property of the kneaded material.

In the conventional kneading extruder 501, accordingly, the physical property of the extruded material extruded from the die 516 is unstable and there is a fear that unstability in molded state may exert an influence on quality of products, depending upon combination of the supplied raw materials, form of the end product and/or the like. In particular, there is a fear that such an influence may arise more conspicuously on condition that the molding is carried out with use of the kneading extruder in small size having a comparatively small extrusion quantity. In the kneading extruder in which films, tubes, or the like are directly molded with use of extruded material therefrom, state of molded bodies is unstable because the kneading property of the extruded material directly influences conditions of the molded bodies. On condition that two or more types of the raw materials having different specific gravities are mixed, it is still difficult to stabilize the kneading property.

An object of the invention is to solve above problems and to provide a kneading extruder for kneading a plurality of types of material to produce kneaded material in melted state and extruding the produced kneaded material by rotation of screw shafts which device is capable of compatibly achieving extrusion of the kneaded material in a constant quantity and stabilization of kneading property.

SUMMARY OF THE INVENTION

In order to achieve the above-mentioned object, the invention is configured as follows.

According to a first aspect of the present invention, there is provided a kneading extruder comprising:

a barrel including raw material supply ports through which first raw material and second liquid raw material are supplied and an extrusion port through which kneaded material including the first raw material and the second raw material kneaded and brought into melted state is extruded from inside of the barrel, a screw shaft placed in the barrel, the screw shaft kneading the first raw material and the second raw material to produce the kneaded material in the melted state, a screw driving device continuously rotating the screw shaft at a constant speed, a die communicating with the extrusion port of the barrel, the die having an extrusion port through which the kneaded material in pressurized state extruded through the extrusion port of the barrel, is extruded to outside of the kneading extruder, an ejection device ejecting a portion of the kneaded material extruded through the extrusion port of the barrel, between the extrusion port of the barrel and the extrusion port of the die, and ejection quantity regulating means for regulating quantity of the kneaded material ejected by the ejection device so that pressure of the kneaded material at the extrusion port of the barrel is kept constant.

According to a second aspect of the present invention, there is provided the kneading extruder according to the first aspect, wherein a booster pump boosting the pressure of the kneaded material is provided between the extrusion port of the barrel and the die, and the booster pump is continuously driven at a constant speed.

According to a third aspect of the present invention, there is provided the kneading extruder according to the second aspect, wherein a plurality of dies communicating with the extrusion port of the barrel are provided in parallel, and a plurality of booster pumps are provided so as to individually correspond to the dies.

According to a fourth aspect of the present invention, there is provided the kneading extruder according to the second aspect, wherein the ejection device is provided so that the portion of the kneaded material is ejected from between the booster pump and the extrusion port of the barrel.

According to a fifth aspect of the present invention, there is provided the kneading extruder according to any one of the first through fourth aspects, wherein the ejection device is a gear pump, and the ejection quantity regulating means is means for changing quantity of rotation of the gear pump.

According to a sixth aspect of the present invention, there is provided the kneading extruder according to any one of the first through fourth aspects, wherein the ejection device is a control valve, and the ejection quantity regulating means is means for regulating opening of the control valve.

According to a seventh aspect of the present invention, there is provided the kneading extruder according to any one of the first through fourth aspects, wherein the ejection device comprises a screw for ejecting the portion of the kneaded material by being rotated, and the ejection quantity regulating means is means for changing quantity of rotation of the screw.

According to an eighth aspect of the present invention, there is provided the kneading extruder according to any one of the first through fourth aspects, further comprising an ejection device that ejects a portion of the kneaded material supplied into the die so that pressure at the extrusion port of the die is kept constant.

According to a ninth aspect of the present invention, there is provided the kneading extruder according to any one of the first through fourth aspects, wherein a plurality of screw shafts are provided in the barrel and the screw shafts are continuously rotated at a constant speed by the screw driving device.

According to a tenth aspect of the present invention, there is provided the kneading extruder according to any one of the first through fourth aspects, wherein a first raw material supply port through which the first raw material is supplied and a second raw material supply port through which the second liquid raw material is supplied are provided at different locations on the barrel as the raw material supply ports.

According to an eleventh aspect of the present invention, there is provided the kneading extruder according to any one of the first through fourth aspects, wherein the die carries out direct extrusion molding by extruding the kneaded material from the extrusion port of the die.

According to a twelfth aspect of the present invention, there is provided the kneading extruder according to any one of the first through fourth aspects, further comprising raw material supplying devices continuously supplying the first raw material and the second raw material through the raw material supply ports into the barrel in constant quantities and at a constant ratio.

Effects of Invention

According to the invention of the kneading extruder for kneading a plurality of types of raw materials, a configuration is employed in which the ejection device is provided for ejecting the portion of the kneaded material extruded from the extrusion port of the barrel, between the extrusion port of the barrel and the extrusion port of the die and in which the ejection device includes the ejection quantity regulating means for regulating the ejection quantity of the kneaded material so that the pressure of the kneaded material at the extrusion port of the barrel is kept constant. Therefore, the supply of the kneaded material in the constant quantity can be achieved while the supplying quantity of the raw materials and the quantity of rotation of the screw shafts are kept constant. Accordingly, the extrusion of the kneaded material in the constant quantity and the stabilization of the kneading property can compatibly be achieved.

BRIEF DESCRIPTION OF DRAWINGS

These aspects and features of the invention will be apparent from the following description concerning a preferred embodiment with reference to the accompanying drawings, in which.

DETAILED DESCRIPTION OF THE INVENTION

Figure 1:
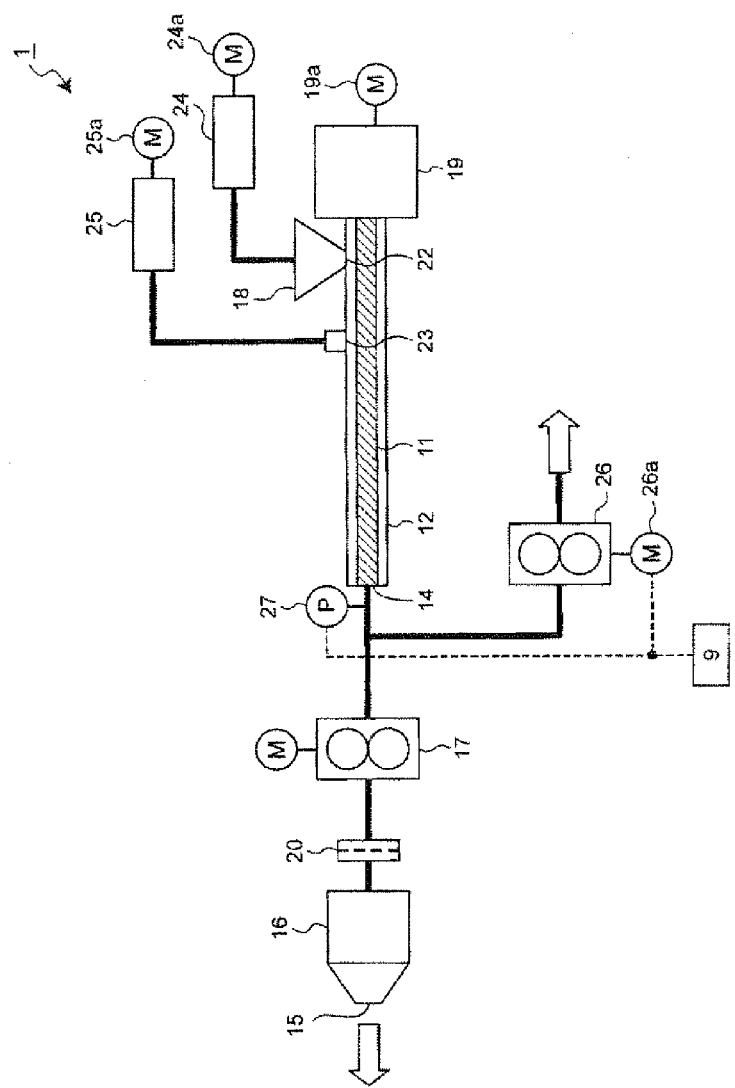
FIG. 1 is a schematic representation of a kneading extruder in accordance with a first embodiment of the invention.

Before the description of the present invention proceeds, it is to be noted that like parts are designated by like reference numerals throughout the accompanying drawings. Hereinbelow, embodiments in accordance with the invention will be described in detail with reference to the drawings.

First Embodiment

FIG. 1 shows a schematic representation illustrating general configuration of a kneading extruder 1 in accordance with a first embodiment of the invention. As shown in FIG. 1, the kneading extruder 1 has a screw shaft 11, e.g., having a single shaft structure, a barrel 12 in which the screw shaft 11 is rotatably placed in an inside space thereof, raw material supplying devices for supplying raw materials into a space between the barrel 12 and the screw shaft 11, a die 16 that is in communication with a barrel extrusion port 14 which is an outlet of the barrel 12 for kneaded material and that extrudes the kneaded material supplied from the barrel 12 to outside of the kneading extruder, and a booster pump 17 that is provided between the barrel 12 and the die 16 and that supplies the kneaded material extruded from the barrel extrusion port 14 to the die 16 while boosting pressure of the kneaded material.

A first raw material supply port 22 through which first raw material is supplied and a second raw material supply port 23 through which second raw material is supplied are provided on the barrel 12. The first raw material and the second raw material are of different types, e.g., solid (or powder-like) raw material and liquid raw material, respectively.

As the raw material supplying devices, a first raw material feeder 24 for supplying the first raw material that is solid and a second raw material feeder 25 for supplying the second raw material that is liquid are provided. A hopper 18 is connected to the first raw material supply port 22 on the barrel 12, and the first raw material is supplied from the first raw material feeder 24 through the hopper 18 into the barrel 12. The second raw material feeder 25 is connected to the second raw material supply port 23 on the barrel 12, and the second raw material is supplied from the second raw material feeder 25 through the second raw material supply port 23 into the barrel 12. The first raw material feeder 24 and the second raw material feeder 25 are provided with drive motors 24a and 25a, respectively, and each drive motor 24a, 25a is driven at a constant number of rotations, so that the first raw material and the second raw material are supplied from the first raw material feeder 24 and the second raw material feeder 25, respectively, into the barrel 12 in constant supplying quantities and in a constant mixture ratio.

The screw shaft 11 has a function of kneading the first raw material and the second raw material that are supplied into the barrel 12 and thereby producing the kneaded material in a melted state by being rotated. Screws having various numbers of threads can be applied to the screw shaft 11. The screw shaft 11 is connected to a screw driving device 19. The screw driving device 19 has a drive motor 19a, and the screw shaft 11 is driven to rotate at a constant speed by the drive motor 19a driven with a constant number of rotations.

A gear pump, which is excellent in constant-quantity suppliability and pressure boosting function, is used as the booster pump 17, for instance. The booster pump 17 is driven at a constant speed so that the kneaded material can be supplied in a constant quantity to the die 16 while the pressure thereof is boosted. A mesh-like filter 20 is provided between the booster pump 17 and the die 16, for instance, and intrusion of foreign matter or the like into the die 16 is thereby suppressed.

The kneaded material having the pressure boosted by the booster pump 17 is supplied into the die 16, and the supplied kneaded material is extruded to the outside of the kneading extruder 1 through a die extrusion port 15 formed into a specified shape at extremity of the die 16. With use of the kneaded material extruded from the die 16, injection molding can be carried out by injection thereof into a metal mold or direct extrusion molding can be carried out in which extrusion molding is directly performed.

An ejection pump 26 for ejecting a portion of the kneaded material through a pipeline is provided in a pipeline between the barrel extrusion port 14 and the booster pump 17, and the ejection pump 26 has a drive motor 26a of which the number of rotations can be variably controlled. A pressure detection unit 27 for detecting the pressure of the kneaded material that is extruded is provided at the barrel extrusion port 14. Control over the number of rotations of the drive motor 26a of the ejection pump 26, ejection by the ejection pump 26 of the portion of the kneaded material supplied through the barrel extrusion port 14 to the booster pump 17, and control over the quantity of the ejection can be performed so that the pressure of the kneaded material that is detected by the pressure detection unit 27 is kept constant.

In the kneading extruder 1, a control device 9 is provided that compares the pressure of the kneaded material, detected by the pressure detection unit 27 in this manner, with a predefined set pressure range and that controls the number of rotations of the drive motor 26a of the ejection pump 26. When the pressure of the kneaded material that is detected by the pressure detection unit 27 is higher than the set pressure range, specifically, the control device 9 performs control by which the quantity of the ejection of the portion of the kneaded material by the ejection pump 26 is increased by increase in the number of rotations of the drive motor 26a. When the pressure of the kneaded material that is detected by the pressure detection unit 27 is lower than the set pressure range, control is performed by which the quantity of the ejection of the portion of the kneaded material by the ejection pump 26 is decreased by decrease in the number of rotations of the drive motor 26a. Operation of the ejection pump 26 can be stopped by decrease in the number of rotations of the drive motor 26a. In the first embodiment, the ejection pump 26 is provided as an example of an ejection device, and the pressure detection unit 27, the drive motor 26a and the control device are provided as an example of an ejection quantity regulating unit for regulating the ejection quantity of the kneaded material. As the ejection pump 26, a pump of some type having comparatively high correlation between the number of rotations and the ejection quantity is preferably applied, and the gear pump is employed, for instance, in the first embodiment.

Subsequently, operations of kneading the first solid raw material and the second liquid raw material and extruding the kneaded material in melted state in the kneading extruder 1 of the first embodiment having such a configuration will be described with use of FIG. 1.

Initially, the first solid raw material is supplied from the first raw material feeder 24 through the hopper 18 and the first raw material supply port 22 into the barrel 12. Similarly, the second liquid raw material is supplied from the second raw material feeder 25 through the second raw material supply port 23 into the barrel 12. The raw materials are supplied with the drive motors 24a, 25a continuously driven with constant numbers of rotations, so that the first raw material and the second raw material are continuously supplied into the barrel 12 in constant supplying quantities and in a constant mixture ratio. Though an example having the first raw material supply port 22 and the second raw material supply port 23 provided in different locations is shown in FIG. 1, both the ports may be provided in the same location.

The drive motor 19a is driven to rotate with a constant number of rotations in the screw driving device 19, and thus the screw shaft 11 is continuously driven with a constant number of rotations in the barrel 12. Screws not shown are provided on the screw shaft 11, and shearing operation is performed for the first raw material and the second raw material that are supplied, between inner surface of the barrel 12 and the screws, so that both the raw materials are kneaded. Concomitantly, the raw materials are heated in the barrel 12 by a heating device not shown. As a result, the first raw material and the second raw material are mixed in the constant mixture ratio, and the kneaded material brought into melted state is produced. The produced kneaded material is conveyed along the inner circumferential surface of the barrel toward the distal end of the barrel 12 by the rotation of the screw shaft 11, and a constant quantity of the kneaded material is continuously extruded through the barrel extrusion port 14.

The kneaded material extruded from the barrel extrusion port 14 is supplied to the booster pump 17, and the kneaded material having the pressure boosted to a specified value by the booster pump 17 is supplied through the filter 20 to the die 16 in a constant quantity and continuously.

On the other hand, the pressure of the kneaded material that is extruded from the barrel extrusion port 14 is detected by the pressure detection unit 27, and the detected pressure value is inputted into the control device 9. In the control device 9, the set pressure range for the kneaded material has been preset and determination is carried out as to whether the detected pressure exceeds the set pressure range or not.

When the detected pressure is lower than the set pressure range, the control device 9 decreases the number of rotations of the drive motor 26a and thereby decreases the quantity of the kneaded material that is ejected by the ejection pump 26. When the detected pressure is higher than the set pressure range, oppositely, the control device 9 increases the number of rotations of the drive motor 26a and thereby increases the quantity of the kneaded material that is ejected by the ejection pump 26. By such control, the pressure of the kneaded material at the barrel extrusion port 14 is kept within the set pressure range and the constant quantity of the kneaded material is continuously supplied to the booster pump 17. In configuration of the first embodiment, the kneaded material ejected by the ejection pump 26 is discarded, for instance, without being returned to the kneading extruder 1.

The booster pump 17 boosts the pressure of the kneaded material that is continuously supplied under the constant pressure and in the constant quantity, and continuously supplies the kneaded material through the filter 20 to the die 16 in the constant quantity. In the die 16, the supplied kneaded material is extruded through the die extrusion port 15 to the outside of the kneading extruder 1. Molded objects are produced by molding with use of the extruded kneaded material (extruded material).

According to the kneading extruder 1 of the first embodiment, the screw shaft 11 is continuously driven to rotate at the constant speed, and the first raw material and the second raw material are continuously supplied by the first raw material feeder 24 and the second raw material feeder 25, respectively, in the constant supplying quantities and in the constant mixture ratio. In addition, the control method is employed in which a portion of the kneaded material is drawn out by the ejection pump 26 and is ejected to the outside of the device in order that the pressure of the kneaded material at the barrel extrusion port 14 may be kept constant.

Accordingly, the raw materials to be mixed can be kneaded in the constant ratio, in the constant quantity, and in the constant shear rate so that the kneaded material in melted state can be produced. In addition, the residence time of the kneaded material in the barrel 12 can be made constant. As a result, stabilization of kneading property of the kneaded material can be achieved while the supply of the kneaded material in the constant quantity can be achieved.

The quantity of the kneaded material that is ejected from the vicinity of the barrel extrusion port 14 is controlled according to a change in the pressure detected at the barrel extrusion port 14. Thus, decrease in time lag in the control over the change in the pressure and improvement in responsiveness of the control can be attained.

Herein, "kneading property" refers to properties of the kneaded material including conditions such as uniformity and number of pores, e.g., for porous molded bodies, in addition to mechanical properties (tensile strength, impact strength, hardness and the like) of molded bodies. The kneading property can include conditions of functional properties such as electrical conductivity, incombustibility, permeability, transparency, water absorbency, and weather resistance, in addition to such mechanical properties, depending upon raw materials that are used and purposes of molded bodies.

On condition that the raw materials having different specific gravities, different fluidity and/or the like are mixed, in particular, change in the supplying quantities of the raw materials, the number of rotations of the screw shaft or the like makes it difficult to stabilize the kneading property of the kneaded material because repletion quantity, inside residence time and/or the like of the raw materials in the barrel are changed even if there is only one supply port for the raw materials on the barrel.

In the first embodiment, which employs the configuration for keeping the supplying quantities of the raw materials, the number of rotations of the screw shaft and the constant state of kneading in the barrel 12 can be kept constant while the mixture quantities and mixture ratio of the raw materials are kept constant, so that the kneading property can be stabilized, even in the mixture of the raw materials having a difference in specific gravity such as solid-liquid mixture of the raw materials, or the like.

The kneading extruder of the first embodiment can be applied to an application in which kneaded material is produced with use of polymeric raw material as the first solid raw material and oil-based raw material as the second liquid raw material and in which porous molded bodies or the like are directly molded as the molded objects, for instance. In the directly molding (direct extrusion molding) of porous molded bodies, particularly, formation of smaller and more uniform pores in addition to the mechanical properties of the molded bodies is demanded as the kneading property, and severe conditions of the kneading property, such as that change in the properties with elapse of time is impermissible, are also demanded. Therefore, it is strongly demanded that the kneading property for the molded bodies should be kept persistent and homogeneous, and it is particularly required that the kneaded material has homogeneous kneading property at the moment that the kneaded material flows into the booster pump. In the molding of such porous molded bodies, furthermore, the mixture ratio of the second liquid raw material often exceeds 50%, and thus stability of the kneading state of the kneaded material and constant-quantity property thereof are strongly demanded. It is therefore effective to employ the kneading extruder 1 of the first embodiment for the molding of such porous molded bodies.

The kneading extruder 1 can be operated so that the kneaded material is produced with the first and second raw material feeders 24, 25 supplying 110% relative quantity of the raw materials, with respect to the quantity of the material extruded from the die 16 assumed as 100%, and so that 10% quantity of the kneaded material is ejected by the ejection pump 26, for instance. With selection of pump specifications of the ejection pump 26 under an advance assumption of such ejection of a certain quantity of the kneaded material, controllability of the ejection pump 26 over the quantity of the ejection on basis of the pressure detection can be made satisfactory, and the control for stabilizing the pressure at the barrel extrusion port 14 can satisfactorily be performed. The relative quantities of the materials only make an example, and 110% or larger quantity of the raw materials may be supplied from the first and second raw material feeders 24, 25 or 110% or smaller quantity of the raw materials may be supplied therefrom.

When it is demanded that the extrusion quantity at the die 16 be decreased in the kneading extruder 1, for instance, the demand can be addressed by increase in the quantity of the ejection by the ejection pump 26. Accordingly, the extrusion quantity at the die 16 can be set at a desired value by variable setting of the quantity of the ejection by the ejection pump 26, without determination of device specifications having even extrusion quantity from the die designated as molding quantity. Therefore, molding in small quantity can also be addressed by use of the kneading extruder with comparatively large throughput, instead of preparation of a plurality of types of devices including those of large size through those of small size according to the molding quantity. In particular, direct molding in extremely small quantity of several grams/h, which has been difficult to address by conventional kneading extruders, can be attained by reduction in size of the kneading extruder of the first embodiment.

On assumption of a comparative example of the kneading extruder 1 of the first embodiment, a method of keeping the pressure of the kneaded material at the barrel extrusion port constant is conceivable by which the pressure at the barrel extrusion port is kept constant by use of a pressure regulator tank typified by accumulator and change in capacity of the tank. In the method using the pressure regulator tank, however, it is thought that difference in residence time in the tank may cause change in viscosity because the kneaded material can be in various forms such as powder-like material and liquid material and is often non-single fluid. It is therefore assumed that physical property of the kneaded material returned from inside of the tank can be different from that of ambient kneaded material and can cause an influence on the state of supply in the constant quantity, and it is difficult to compatibly achieve the stabilization of the kneading property of the kneaded material and the supply in the constant quantity.

If a configuration in which a portion of the kneaded material extruded from the barrel extrusion port is returned into the barrel is employed, change in the physical property of the returned kneaded material may make it difficult to stabilize the kneading property.

For a kneading extruder having a purpose of continuous molding such as the kneading extruder 1 of the first embodiment, accordingly, it is not allowed to employ the return of the kneading material into the barrel and/or temporary storage thereof in the pressure regulator tank, in terms of the stabilization of the kneading property of the kneaded material. It is therefore effective to employ the configuration in which a portion of the kneaded material is ejected by the ejection device and to thereby achieve both the stabilization of the kneading property of the kneaded material and the supply in the constant quantity, as in the first embodiment.

Second Embodiment

Figure 2:
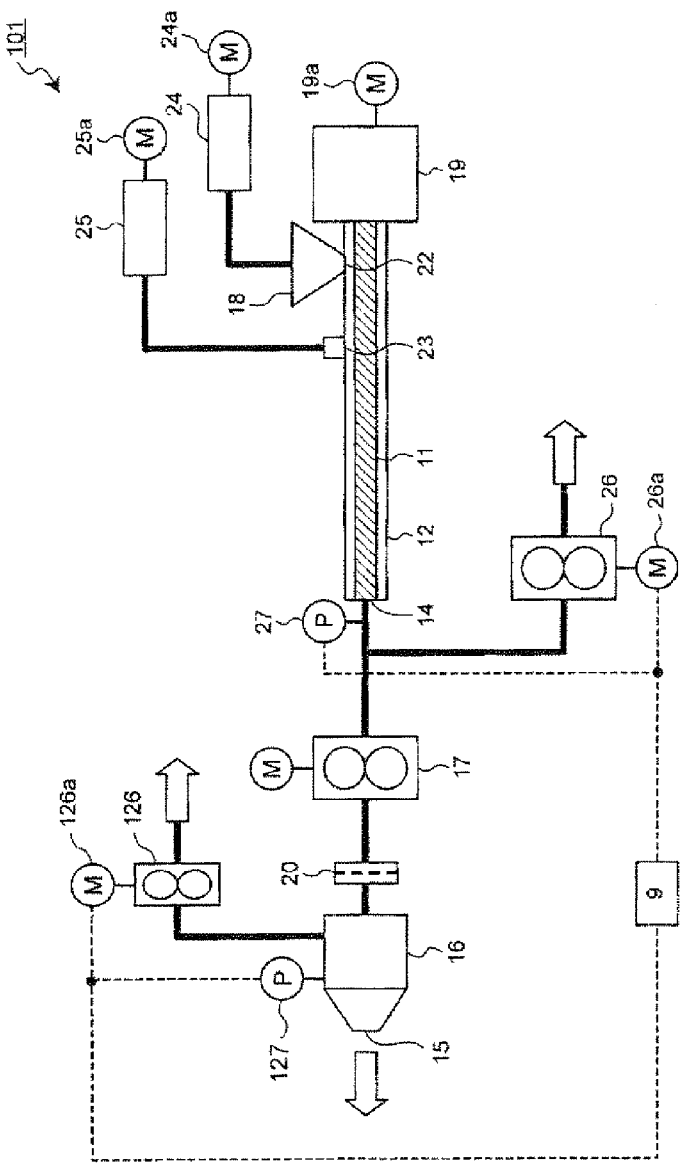
FIG. 2 is a schematic representation of a kneading extruder in accordance with a second embodiment of the invention.

The invention is not limited to the first embodiment and can be embodied in other various manners. For instance, FIG. 2 shows a schematic representation illustrating general configuration of a kneading extruder 101 in accordance with a second embodiment of the invention. For the kneading extruder 101 of FIG. 2, the same components as those of the kneading extruder 1 of the first embodiment are designated by the same reference characters and description thereof is omitted.

As shown in FIG. 2, the kneading extruder 101 of the second embodiment is different from the configuration of the first embodiment in that the device 101 has a configuration for ejecting a portion of kneaded material in the die 16. Hereinbelow, only different components will be described.

As shown in FIG. 2, a second ejection pump 126 is connected through a pipeline to the die 16. The second ejection pump 126 has a drive motor 126a of which the number of rotations can variably be controlled. A second pressure detection unit 127 is provided for detecting the pressure of the kneaded material in the vicinity of the die extrusion port 15 in the die 16.

The pressure of the kneaded material in the die 16 that is detected by the second pressure detection unit 127 is inputted into the control device 9, and control over the number of rotations of the drive motor 126a by the control device 9 and control over of ejection quantity of the kneaded material by the ejection pump 126 are performed so that the pressure comes within a predefined set pressure range.

By such control, the pressure of the kneaded material in the die 16 can be kept constant, and the kneaded material can more stably be extruded. Such configuration in which a portion of the kneaded material is ejected at the die 16 is effective for molding in small quantity, in particular. Instead of both the ejection of a portion of the kneaded material at the barrel extrusion port 14 and the ejection of the portion of the kneaded material at the die 16 as shown in FIG. 2, only the ejection of a portion of the kneaded material at the die 16 may be performed.

Third Embodiment

Figure 3:
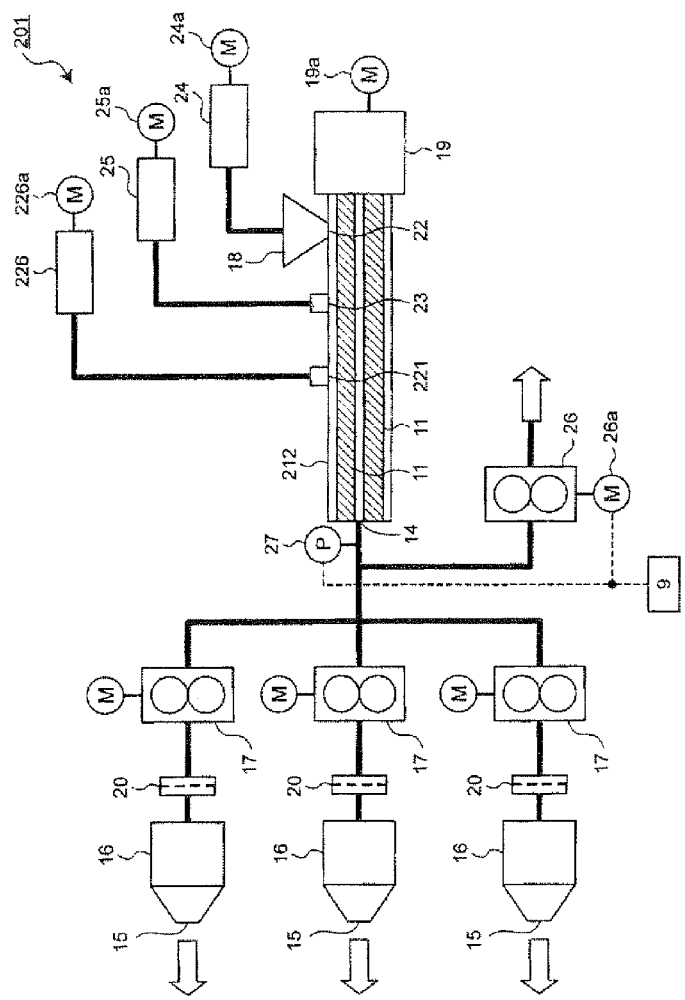
FIG. 3 is a schematic representation of a kneading extruder in accordance with a third embodiment of the invention.

FIG. 3 shows a schematic representation illustrating a general configuration of a kneading extruder 201 in accordance with a third embodiment of the invention. For the kneading extruder 201 of FIG. 3, the same components thereof as those of the kneading extruder 1 of the first embodiment are designated by the same reference characters and description thereof is omitted.

As shown in FIG. 3, the kneading extruder 201 of the third embodiment is different from the configuration of the first embodiment in that screw shafts 11 have double shaft structure, in that a supplying device for third raw material is added as the raw material supplying device, and in that a plurality of systems each extending from a booster pump 17 to a die 16 are provided. Hereinbelow, only different components will be described.

As shown in FIG. 3, a third raw material supply port 221 is additionally provided on a barrel 212, so that the third raw material different in type from the first and second raw materials can be supplied from a third raw material feeder 226 into the barrel 212. The third raw material feeder 226 has a drive motors 226a, and the drive motor 226a is driven at a constant number of rotations, so that the third raw material is continuously supplied in a constant quantity into the barrel 212.

The two screw shafts 11 meshing with each other are placed in the barrel 212. The two screw shafts 11 are driven to rotate at a constant rotation speed by the screw driving device 19.

In addition, the pipeline connected to the barrel extrusion port 14 branches out into three pipelines, and each branch pipeline is provided with the booster pump 17, the filter 20, and the die 16.

In the kneading extruder 201 of the third embodiment, in this manner, number of types of the raw materials that are to be mixed may be three or more, and composition of multiple shafts, i.e., that of two shafts or three or more shafts can be applied to the screw shafts.

The booster pump 17 and the die 16 may branch out into a plurality of systems according to final forms of molding.

In the kneading extruder 201, as a result, the extrusion of the kneaded material in a constant quantity and the stabilization of the kneading property can compatibly be achieved while various specifications such as the types of the raw materials, the composition of the screw shafts, and the final forms of molding are flexibly addressed.

Fourth Embodiment

Figure 4:
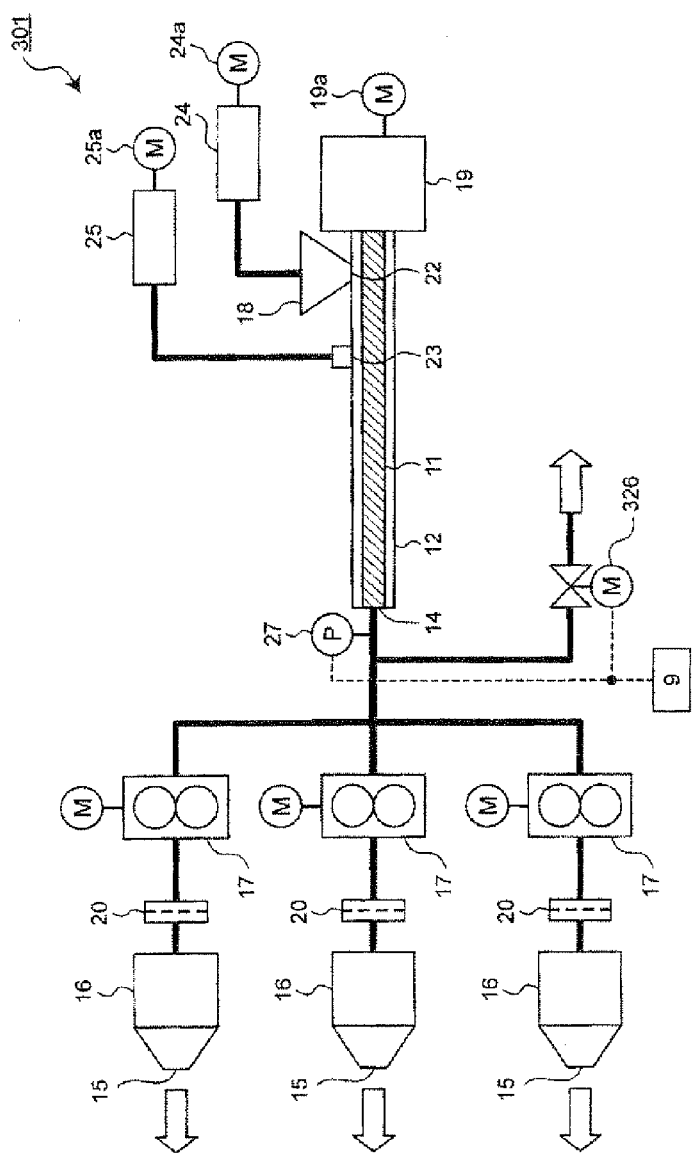
FIG. 4 is a schematic representation of a kneading extruder in accordance with a fourth embodiment of the invention.
Figure 5:
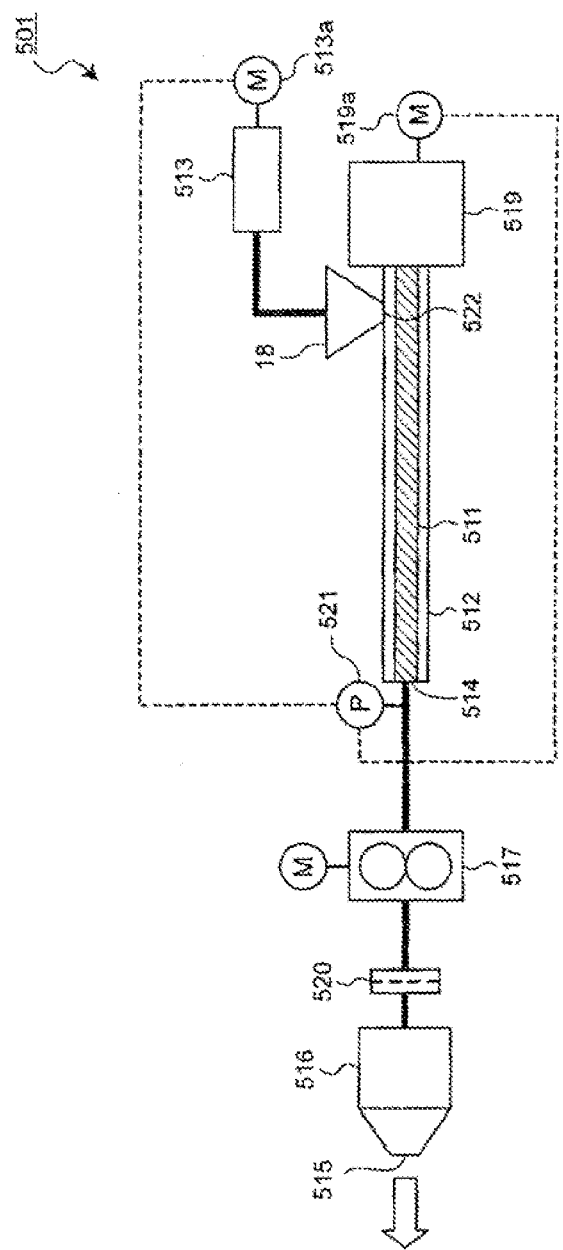
FIG. 5 is a schematic representation of a conventional kneading extruder.

FIG. 4 shows a schematic representation illustrating general configuration of a kneading extruder 301 in accordance with a fourth embodiment of the invention. For the kneading extruder 301 of FIG. 4, the same components thereof as those of the kneading extruders 1, 201 of the first and third embodiments are designated by the same reference characters and description thereof is omitted.

As shown in FIG. 4, the kneading extruder 301 of the fourth embodiment has a configuration different from those of the first and third embodiments in that a control valve, instead of the ejection pump, is used as the ejection device for ejecting a portion of kneaded material extruded from the barrel extrusion port 14. Hereinbelow, only different components will be described.

As shown in FIG. 4, the control valve 326 is provided, by being connected through a pipeline for ejecting the portion of the kneaded material, in middle of a pipeline connecting the barrel extrusion port 14 and the booster pumps 17 in the kneading extruder 301. The control valve 326 has a function of changing the opening thereof by input of external signals, and ejection of a quantity of the kneaded material can be controlled by the change in the opening of the control valve 326.

When pressure of the kneaded material at the barrel extrusion port 14 is detected by the pressure detection unit 27 and when value thereof is inputted into the control device 9, specifically, the control device 9 determines whether the detected pressure is within a set pressure range or not. When the detected pressure is higher than the set pressure range, the opening of the control valve 326 is increased and the ejection quantity of the kneaded material is thereby increased. When the detected pressure is lower than the set pressure range, the opening of the control valve 326 is decreased and the ejection quantity of the kneaded material is thereby decreased.

Thus, the pressure of the kneaded material at the barrel extrusion port 14 can be kept constant, and the supply of the kneaded material in a constant quantity and the stabilization of the kneading property can compatibly be achieved, even in use of the control valve 326 as the ejection device for the kneaded material.

Modification

Modifications of the embodiments described above will be described below.

Though the devices provided with the booster pump 17 have been described as examples, configurations lack of the booster pump 17 can be employed.

Though the devices provided with the filter 20 downstream from the booster pump 17 have been described as the examples, the filter 20 may be provided upstream from the booster pump 17 or the filter 20 may be omitted.

Though descriptions have been given on the devices provided with only one die 16 and on the devices provided with three dies 16, number of the provided dies 16 can be determined according to molded forms, specifications and/or the like of the extruded material. The device provided with a plurality of dies 16 is not limited to that provided with the dies 16 all having the same size and the same specifications and may be that provided with the dies 16 having different sizes or different specifications.

Though the devices in which the booster pumps 17 are provided so as to individually correspond to the dies 16 have been described as the examples, configurations may be employed in which the dies 16 and the booster pumps 17 do not individually correspond to each other.

Though the devices in which the ejection pump 26, the control valve 326 or the like is used as the ejection device for ejecting a portion of the kneaded material have been described as the examples, various devices having a function of variably ejecting a desired quantity of the kneaded material can be applied as the ejection device. For instance, a screw type ejection device can be employed in which a screw is used and in which quantity of rotations of the screw can variably be controlled.

The ejection device may further be provided with a strand die, a cooling water tank, and a strand cutter, so that the ejected kneaded material may be formed into pellets and may be reused.

It is to be noted that, by properly combining the arbitrary embodiments of the aforementioned various embodiments, the effects possessed by them can be produced.

The invention is useful for kneading extrusion molding in which solid raw material and liquid raw material are kneaded and in which the kneaded material is extruded and can be applied to the direct extrusion molding because the supply of the kneaded material in constant quantity and the stabilization of the kneading property can compatibly be achieved, even under condition of high mixture ratio of the liquid raw material, in particular.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The disclosure of specification, drawings, and claims of Japanese patent application No. 2010-122848 filed on May 28, 2010 is incorporated herein by reference in its entirety.

The invention claimed is:

1. A kneading extruder comprising:
   a barrel including a first raw material supply port through which a first raw material is supplied, a second raw material supply port through which a second liquid raw material is supplied, and a barrel extrusion port through which kneaded material including the first raw material and the second raw material in a melted state is extruded from inside of said barrel, said second raw material supply port being located downstream of said first raw material supply port;
   a screw shaft in said barrel, said screw shaft being configured to knead the first raw material and the second raw material to produce the kneaded material in the melted state;
   a screw driving device configured to continuously rotate said screw shaft at a constant speed;
   a die communicating with said barrel extrusion port, said die having a die extrusion port through which the kneaded material in a pressurized state extruded through said barrel extrusion port is extruded to outside of said kneading extruder;
   a first gear pump for ejecting a portion of the kneaded material extruded through said barrel extrusion port, said first gear pump being located between said barrel extrusion port and said die;
   a first ejection quantity regulating unit for changing a quantity of rotations of said first gear pump to regulate a quantity of the portion of the kneaded material ejected by said first gear pump so that a pressure of the kneaded material between said barrel extrusion port and said die is maintained constant;
   a booster pump for boosting the pressure of the kneaded material, said booster pump being located between said barrel extrusion port and said die;
   a second gear pump for ejecting a portion of the kneaded material supplied into said die; and
   a second ejection quantity regulating unit for changing a quantity of rotations of said second gear pump to regulate a quantity of the portion of the kneaded material ejected by said second gear pump so that the pressure of the kneaded material at said die extrusion port is maintained constant.

2. The kneading extruder according to claim 1, wherein said die is one of a plurality of dies communicating with said barrel extrusion port and arranged in parallel, and said booster pump is one of a plurality of booster pumps arranged to correspond to a respective one of said dies.

3. The kneading extruder according to claim 1, wherein said screw shaft is one of a plurality of screw shafts in said barrel, said screw driving device being configured to continuously rotate said screw shafts at a constant speed.

4. The kneading extruder according to claim 1, wherein said die is configured to perform direct extrusion molding by extruding the kneaded material from said die extrusion port.

5. The kneading extruder according to claim 1, further comprising:
   a first raw material supplying device for continuously supplying the first raw material through said first raw material supply port into said barrel in constant quantities and at a constant ratio; and
   a second raw material supplying device continuously supplying the second liquid raw material through said second raw material supply port into said barrel in constant quantities and at a constant ratio.

6. The kneading extruder according to claim 1, wherein said booster pump is configured to be continuously driven at a constant speed.

7. The kneading extruder according to claim 1, wherein said first ejection quantity regulating unit includes:
   a pressure detecting unit for detecting the pressure of the kneaded material at said barrel extrusion port;
   a drive motor for driving said first gear pump; and
   a control device for comparing the pressure detected by said pressure detecting unit to a pre-set pressure, and for controlling said drive motor based on a result of the comparison of the detected pressure at said barrel extrusion port and the pre-set pressure.

8. The kneading extruder according to claim 7, wherein said second ejection quantity regulating unit includes:
   a second pressure detecting unit for detecting the pressure of the kneaded material at said die;
   a second drive motor for driving said second gear pump; and
   said control device of said first ejection quantity regulating unit, said control device being further configured to compare the pressure detected by said second pressure detecting unit to a second pre-set pressure, and to control said second drive motor based on a result of the comparison of the detected pressure of the kneaded material at said die and the second pre-set pressure.

* * * * *